United States Patent [19]

Kim et al.

[11] Patent Number: 5,432,213
[45] Date of Patent: Jul. 11, 1995

[54] WATER-PERMEABLE RESINOUS COMPOSITION FOR ROAD PAVING OF HIGH STRENGTH AND BLOCKS AND PAVEMENT THEREOF

[75] Inventors: Hyun-Don Kim; Cheon-Seok Lee; Ju-Hyun Son; Seung-Ho Jeon, all of Taejon, Rep. of Korea

[73] Assignee: Samsung General Chemicals Co., Ltd., Chungnam, Rep. of Korea

[21] Appl. No.: 123,889

[22] Filed: Sep. 20, 1993

[30] Foreign Application Priority Data

Sep. 19, 1992 [KR] Rep. of Korea ............... 17137/1992
Sep. 19, 1992 [KR] Rep. of Korea ............... 17138/1992

[51] Int. Cl.⁶ .......................... C08L 1/12; C08L 1/28; C08L 1/04
[52] U.S. Cl. .......................... 524/41; 524/37; 524/42; 524/43; 524/44; 524/45; 524/46; 524/72; 524/13
[58] Field of Search .......................... 524/13, 14, 15, 16, 524/35, 37, 41, 42, 43, 44, 45, 46, 72

[56] References Cited

U.S. PATENT DOCUMENTS 2,993,016  7/1961  Sucetti ............... 524/37
3,407,165 10/1968  Oepkes et al. ....... 524/13
3,654,199  4/1972  Bourette ............. 524/16

FOREIGN PATENT DOCUMENTS 0241078 10/1988  Japan ............... 524/14
0046976  2/1992  Japan ............... 524/45
1087497  4/1984  U.S.S.R. ........... 524/14

*Primary Examiner*—Peter A. Szekely
*Attorney, Agent, or Firm*—Watson, Cole, Grindle & Watson

[57] ABSTRACT

The present invention relates to a high strength water-permeable resinous road paving composition characterized by the use of 2–20 weight parts of thermosetting resin as a binder per 100 weight parts of granular aggregate and 1–20 weight parts of cellulose or 1–30 weight parts of lignocellulose as botanical fiber or their derivatives as additives per 100 weight parts of said thermosetting resin.

Another feature of the present invention is to mix certain amount of inorganic substances in fine granular or fibrous form together with said granular aggregate, thermosetting resin, cellulose or lignocellulose, or their derivatives, wherein said inorganic substance is 5–200 weight parts per 100 weight parts of said resin. Furthermore, footpath blocks or pavement of footpaths, driveways, plazas, etc. by the use of the composition of the present invention is another feature of the present invention.

15 Claims, 1 Drawing Sheet

WATER-PERMEABLE RESINOUS COMPOSITION FOR ROAD PAVING OF HIGH STRENGTH AND BLOCKS AND PAVEMENT THEREOF

This application is a United States counterpart to Korean Application Serial No. 17137/1992, which was filed Sep. 19, 1992, and Korean Application Serial No. 17138/1992, which was filed Sep. 19, 1992. Applicant claims the priority date of these foreign filings.

BACKGROUND OF THE INVENTION

1. Field of Invention

The present invention relates to a water-permeable resinous composition for road paving having high strength and adequate water-permeability for use in paving such as footpaths, driveways, parking lots, plazas.

The present invention also relates to a pavement of footpaths, driveways, and others, that uses thermosetting resins and as additives to obtain great strength and adequate water-permeability.

The present invention also includes water-permeable blocks for paving footpaths, composed of the aggregate, thermosetting resins, and additives for improvement of adhesion, to pave on the prior water-permeable concrete or asphalt layer.

More particularly, the present invention relates to a resinous composition for road paving that has high strength and permeability, and is composed of the aggregate, thermosetting resins, and cellulose or lignocellulose, or their derivatives as additives for improvement of the adhesion of the latter.

2. Background of Related Art

The rapid advance of modern industries and swift urbanization has caused an astounding increase in areas paved with asphalt, concrete, and various other types of paving composites. This increase of paved areas has in its turn brought about various problems because the rain water in the rainy season, unable to permeate into the soil, quickly drains away through the sewage system. The problems include, for example, (1) decrease of moisture of the ground which causes drainage of the land of underground water and the resultant retarding of the growth of roadside trees; (2) flooding of sewers at times even of an inconsiderable rainfall, water concentrating in the system at once; (3) higher of underground temperatures and insufficiency of oxygen speeding ecological changes; and (4) higher of summer time temperature in urban areas due to upon lessened radiation of the terrestrial heat; and others.

With a view to overcoming these problems water-permeable paving systems making use of water-permeable materials have been developed, including water-permeable asphalt and water-permeable concrete, and these are somewhat widely in use in paving footpaths, driveways, plazas, parking lots, and the like. But paving by the water-permeable asphalt has its own inherent problems: in the mid-day heat of hot summers the asphalt easily melts and the water-permeation holes clog, quickly reducing the water-permeation, while the holes and gaps inside the pavement increase in number enlarging the areas of the surface where water and air contact, thus hastening the aging of the asphalt itself (see Handbook on Water-Permeable Pavement, By Roadbuilding Association of Japan). The water-permeable concrete paving is known to aid the water-permeable asphalt paving in resistance against aging and the general strength, but its pavement surface easily erodes, is weak in shock resistance, and, its surface is rough with poorer elasticity, resulting in less comfort for the walker than the latter. In both of these two ways of paving the water-permeable paving material is invariable black or dull gray in color, monotonous in a word, and even when it is deliberately colored the color very easily fades or smudges, that is, they are either of them no way very suitable for paving sidewalks or passages for strollers in a park, if not from a particularly aesthetic point of view.

A solution to all these drawbacks of the water-permeable asphalt and water-permeable concrete paving is the paving with water-permeable resinous paving material, wherein the components of aggregate are put together tight by water-permeable resin. Paving with this water-permeable resinous paving material is not only better than the above-described water-permeable asphalt or water-permeable concrete paving in its water-proofing, antichemical, or anti-wear characteristics but in its such other physical properties as strength against compression, binding, and tension. This water-permeable resinous paving has advantages in that, even in extreme heat in summer, the reduction of strength is little, a small quantity of adhesive is required, and that good sense of beauty can be had because the synthetic resin is semi-transparent and so the natural color of a chosen color of color ceramic aggregate can be maintained as it is.

However, the thermosetting resin used in the water-permeable resinous paving system is rather expensive, and thus the system rather lacks in economic feasibility. Because of this expensiveness of the resin it is only sparingly used, or else the layer of the paving is made as thin as possible.

In fact, water-permeable resinous paving has typically had only as little as 20 mm or less of thickness, hardly sufficient. A layer so thin is merely paved on the top of water-permeable asphalt or water-permeable concrete, resulting in a difficulty in actual paving work (Japan's Patent Laid-Open Gazette Hei-3-169901). Because of such a drawback as this the water-permeable resinous paving is made use of only in paving footpaths, which do not usually require particularly great strength, and not used in paving driveways, which invariably require great strength of a pavement.

The inventors of the present invention have come to develop a new high-strength water-permeable resinous paving composition which can be used in paving driveways, which has great strength, which uses a small quantity of resin. This invention resolves those problems set forth above of the water-permeable asphalt or water-permeable concrete paving of prior arts.

The objective of the present invention is to provide a resinous composition for road paving which has both high strength and good water-permeability.

Another objective of the present invention is to provide a high strength water-permeable composition for road paving which, even if only a small quantity of resin is used in a thin layer, still has a sufficient strength and good water-permeability for paving driveways also.

Still another objective of the present invention is to provide a road pavement formed by way of paving footpaths, driveway, parking lots, plazas, and the like. With resinous paving material being used to ensure that a paved surface having a high strength and good water-permeability is given over the base of a road.

Yet another objective of the present invention is to provide water-permeable road blocks to form a water-permeable resinous pavement layer over the water-permeable asphalt of concrete layer of footpaths.

SUMMARY OF THE INVENTION

The high strength water-permeability resinous composition for road paving of the present invention is characterized by the use of thermosetting resin as a binder of granular aggregate and also botanical fibrous cellulose or its derivatives as an additive of the thermosetting resin. More particularly, the high strength water-permeable resinous composition of the present invention is characterized by comprising 100 weight parts of the granular aggregate, 2-20 weight of the thermosetting resin as the binder, and 1-20 weight parts of cellulose or its derivative per 100 weight parts of said resin as the additive.

In the present invention, when some inorganic substances are used together with the granular aggregate, thermosetting resin, and cellulose or its derivative, the inorganic substances are added in proportion of 5-200 weight parts per 100 weight parts of the resin.

Furthermore, the present invention is also a characterized in that, as additive of the resin, lignocellulose or its derivatives are used in place of the said botanical fibrous cellulose or its derivatives. More particularly, the high strength water-permeable resinous composition for road paving of the present invention is characterized by comprising 100 weight parts of the granular aggregate, 2-20 weight parts of the thermosetting resin, and 1-30 weight parts of the lignocellulose or its derivative per 100 weight parts of the resin, as the additive.

The present invention also includes that fine granular or fibrous inorganic substances are mixed with said granular aggregate, thermosetting resin, and lignocellulose or its derivatives. Said fine granular of fibrous inorganic substances uses 5-200 weight parts per 100 weight parts of thermosetting resin.

The present invention also includes the paved body (pavement) formed by paving footpaths, driveways, parking spaces, plazas, and the like with the above-said high strength water-permeable resinous composition for road paving.

Now, referring to the accompanying drawings, the present invention is described in further detail.

DETAILED DESCRIPTION OF THE PREFERRED EMBODIMENTS

The high strength water-permeable resinous composition for road paving of the present invention comprises 100 weight parts of granular aggregate, 2-20 weight parts of thermosetting resin for the binder of the aggregate and 1-20 cellulose or its derivative as additives for improvement of the adhesion of the thermosetting resin and the aggregate per 100 weight parts of the thermosetting resin. Wherein the quantity of the thermosetting resin can be adjusted adequately depending upon the required water-permeability and strength of the composition.

Alternatively, the high strength water-pavement resinous composition for road paving may also be composed of 100 weight parts of granular aggregate, 2-20 weight parts of thermosetting resin as a binder for the aggregate and 1-30 weight parts of lignocellulose or its derivative for improvement of adhesion of the aggregate and thermosetting resin per 100 weight parts of resin wherein also the quantity of the thermosetting resin can be adequately adjusted depending upon the required water-permeability and strength of the composition.

Figure 1:
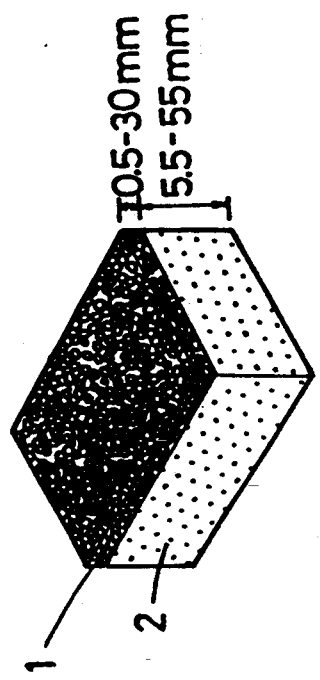
FIG. 1 is a perspective view of the footpath paving block or water-permeable resinous pavement in accordance with the present invention which forms a layer over either a water-permeable concrete layer or a water-permeable asphalt layer.

Since the high strength water-permeable resinous composition for road paving of the present invention has anti-compression strength more than twice the conventional resinous paving position, it can be made into road blocks for footpaths consisting of a water-permeable resinous road paving upper layer (1) of the present invention and the conventional water-permeable concrete or asphalt lower layer (2), as shown in FIG. 1. The footpath blocks made by the present invention have sufficient anti-compression strength even with the use of a small quantity of thermosetting resin. Because the water-permeable resinous paving layer (1) of the present invention has sufficient anti-compression strength, it can be made in footpath blocks of 5-30 mm in thickness. When these blocks are used then the conventional water-permeable concrete or asphalt layer (2) may be of 30-55 mm in thickness.

Figure 2:
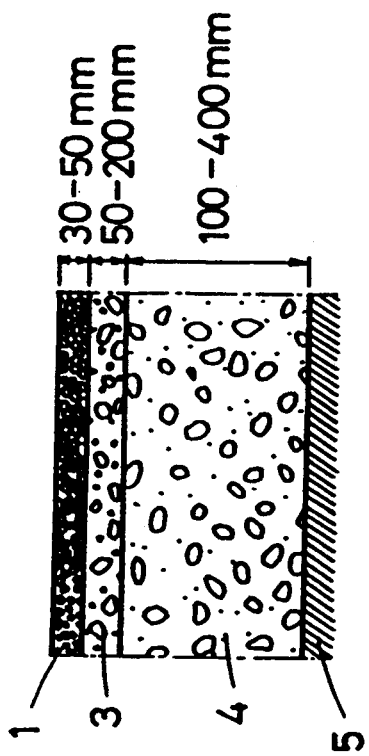
FIG. 2 is a sectional view of the water-permeable resinous pavement in accordance with the present invention which forms an upper layer over the road bed of a footpath, driveway, parking lot, or a plaza.

FIG. 2 indicates the resinous pavement formed over the road base such as a footpath, driveway, plazas, in particular, the resinous pavement formed by resinous composition of the present invention on top consisting of the road bed (5), the lower layer (4) and the upper layer (3).

The lower layer (4) which comes on the top of the road bed (5) is 100-400 mm thick; the upper layer (3) which comes on the top of the lower layer (4) is 50-200 mm thick; the water-permeable pavement layer which comes over all the rest is about 30-50 mm thick. The lower layer (4) is composed of earth, crushed stone, sand and the like; the upper layer (3), of crushed stone whose particles are well unified, water-permeable concrete, and water-permeable asphalt.

The adequate diameters of the particles of the aggregate used in the present invention are desired to range from 0.5 mm to 15 mm, and the range of 2-10 mm is better preferable. If the granular diameter exceeds 15 mm the water-permeability of the pavement formed by the composition rises but the lacunae increase, so that the strength of pavement reduces, the surface gets uneven and irregular, and the outward appearance of the pavement worse to look at. When the granular diameter is less than 0.5 mm the strength of the pavement formed thereby rises but there is a tendency that the lacunae are clogged, reducing the water-permeability of the pavement.

As described in the Korean Patent Laid-Open Gazette No. 91-6968, it is possible to use all the different types of aggregate, that is, the fine granular, small granular, and larger granular aggregate can be used but a careful selection is required in accordance with the desired strength and permeability. Where same quantity of resin is used, the distribution of aggregate particles is in a range extending from the fine to the large.

The kinds of aggregate used in the present invention include ordinary crushed stone, sand, rough sand, silica, natural stone, and the like. As the particles of such aggregate are nearer to spherical in the shape the areas of contact between these particles get larger, anti-compression thereof is greatly excellent, and therefore, in order to improve the anti-wear resistance of the water-permeable road pavement, use of the aggregate of greater hardness is preferred. The most preferable aggregate relevant to such a characteristic is natural gravels. However gravels of 0.5–15 mm in diameter is not widely available and, thus, it has problem to secure a vast quantity of this for actual use. In view of the availability for common use an aggregate of ordinary crushed stone is most preferable. Since the particles of such aggregate are of angular forms, they are apt to easily break when impact is given thereto, as well as the anti-wear resistance of the surface being anything but optimal.

However in the present invention when the thermosetting resin as a binder and cellulose or lignocellulose as an additive are used there is no problems at all because such crushed stone has high binding force.

According to the present invention, the use of aggregate of natural water-permeable color resinous material allows for road paving nice appearance to be formed. In other words, color ceramic aggregate prepared by sintering ceramic material mixed with commonly known pigment at high temperatures and color sand or color crushed stone simply colored with pigment, can be used for preparation of high strength water-permeable resinous color paving material. In especial, the artificial color ceramic aggregate (trade names: DAORAREC) of Japan's CE-RAUEI, Ltd., because it is strong against abrasion, with little foreign substance, while rich in pure silicon dioxide ($SiO_2$), has its adhesive capability when used in combination with the resinous adhesive of the present invention, to give a high strength water-permeable color resinous paving material with greatly higher strength than when mere crushed stone is used.

The kinds of thermosetting resin that may be used in the present invention include commonly known epoxy resins such as Kukdo Chemical Ltd.'s trade name: YD-115, YD-117, and YD-126, and Jungdo Ltd.'s CW-205, CW-208, RM-1, and RM-2, unsaturated polyester resins or vinyl ester resins such as Aegyong Chemicals Ltd.'s PC-N, RC-104N, FG-284, FG-284, FG-387, and VE-604, urethane resins such as Kangnam Chemicals Ltd.'s PF-300 and PF-300 and PF-359, along with other phenol resins, melamine resins, and vinyl urea resins. Of all these, however, normally the epoxy, unsaturated polyester, or vinylester resins are preferable in view of their strength in adhesion with aggregates.

Of course, when any of said thermosetting resins is used as paving material some hardener as commonly known compounds are also used. For example, in the case of the epoxy resins the polyamide resin and teraethyltriamine (TETA) are normally used; in the case of unsaturated polyester resins and vinyl ester resins, methyl ethyl ketone peroxide (MEKPO) or benzoyl peroxide is used. When unsaturated polyester and vinyl ester resin are in use it is desirable to use hardening accelerator to obtain perfectly hardened substance or to adjust the hardening time wherein the commonly known accelerator used include cobalt naphthanate (Co-Naph).

The thermosetting resin used in the present invention is desired to have, normally, a 500–5,000 cps, viscosity, and if the viscosity exceeds 5,000 cps although the strength of the water-permeable resinous road paving material rises, the operational efficiency gets less good because mixing of the resin and the aggregate is quite difficult. In contrast, the resin having 500 cps or less viscosity is not good in terms of its own mechanical properties and as a result the strength of the water-permeable paving material as the end product is apt to get weakened.

In the present invention cellulose or its derivatives are used to improve the a binder capability of the aggregate and the thermosetting resin. The kinds of cellulose or its derivatives used here include alpha cellulose (trade name: ABOCEL, a German Rettenmaier & shohne make) and methyl cellulose, methylhydroxypropyl cellulose, hydroxypropyl cellulose, hydroxyethyl cellulose, benzyl cellulose, and cellulose acetate (all of the above products of Aqualon, U.S.) These materials usually exist in form of powders, and when added to thermosetting resin they all have a viscosity increasing effect that increases remarkably those concentration of the resin around the aggregate.

Furthermore, to increase the a binder capability of the aggregate and the thermosetting resin, lignocellulose or its derivatives are used. Said lignocellulose comprises cellulose, hemicellulose, and lignin and can include, for example, wood, rice hulls, rice straw, etc. The lignocellulose, because it has a great amount of hydroxy groups having strong binding force with the aggregate which in turn has hydrophilic surface traits, is capable of contributing to a secondary binding force, and simultaneously it is a high molecular weight complex having hydrophobic and crystalline structures which can contribute to the basic strength of the end product. Widely available at a low price in nature it is very useful as an additive of thermosetting resins.

The derivatives of lignocellulose used in the present invention are obtained by chemical modifying reactions such as etherizing or esterifying reactive radicals, e.g. part or all of the hydroxyl groups contained in lignocellulose. Lignocellulose does not have thermo-plasticity, and it is lacking in miscibility with thermosetting resins. The derivatives of the lignocellulose are used to make up for some such drawbacks of lignocellulose, and the methods for preparation of them are given in detail in Japan's Patent Laid-Open Gazettes Sho 57-103804, 56-135552, 57-2360, 61-215675, 61-215679, 61-171744, 61-138722, and 63-63769.

Figure 4:
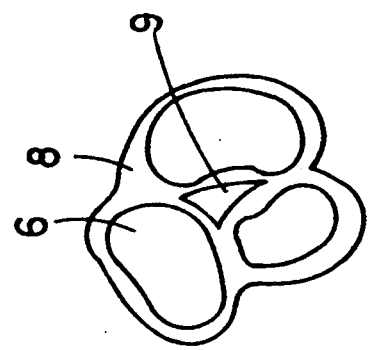
FIG. 4 is a sectional view to show the schematic state adhered the aggregate with the thermosetting resin by addition of the adhesion improvement additives in accordance with the present invention.
Figure 3:
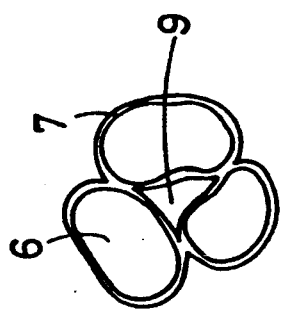
FIG. 3 is a sectional view to show schematic state adhered prior thermosetting resin with the aggregate.

When liquid resin is used alone the adhesion between aggregate components takes place merely in a point-to-point fashion, as shown in FIG. 3, because of its low viscosity. Hence the resinous paving material by itself has a low binding force. In contrast, since in the present invention the viscosity of the resin binding force is raised by addition of cellulose, or derivatives thereof, the adhesion between aggregate components forms a surface-to-surface adhesion type, resulting in a high binding force of the resinous paving material of the present invention. This surface-to-surface adhesion in the present invention is shown in FIG. 4. Another cause of increase adhesion between aggregate components in the present invention is the fact that the cellulose or its derivatives have hydroxy group (—OH) polar radicals and these hydroxy groups are combine secondarily with the hydrophilic SiO2 or SiOH components. Cellulose derivatives for use in the present invention often comprise use two or more types of cellulose, including the low-priced methyl celluloses. The methyl celluloses include methyl cellulose, methylhydroxyethyl cellulose, and methylhydroxylpropyl cellulose.

In the present invention inorganic substances can also be used in mixture, together with the aggregate, thermosetting resin, and cellulose. Inorganic substances in fine granular or fibrous form are normally used as reinforcing agents for the resin. Powder types of inorganic substances include talc, calcium carbonate, silica, and titanium dioxide, and fibrous types include glass fiber, rock wool, and asbestos.

The resinous paving material of the present invention in which inorganic substances of fine granular or fibrous form are used as additives, has been surprisingly found that it is almost entirely free from deterioration through years, unlike those others in which no such inorganic substances are used.

The resinous composition for road paving of the present invention comprises 100 weight parts of the granular aggregate, 2–20 weight parts of thermosetting resin as the adhesive (the binder) and cellulose or its derivative, and 1–20 weight parts of the additive per 100 weight parts of the thermosetting resin.

If the thermosetting resin is used in excess of 20 weight parts the strength of the resinous paving material rises but its water-permeability, in turn, falls to $10^{-2}$ cm/sec$^2$ or less. As the resin is expensive, these compounds may lack commercial success. If, however, the thermosetting resin is used at less than 2 weight parts, the water-permeability of the resinous paving material improves but its strength considerably falls. In order to give water-permeable resinous paving material with its strength of 40 kg/cm$^2$ or more and the water-permeability coefficient of $10^{-2}$ cm/sec$^2$ or more it is desirable to use 2–20 weight parts of the thermosetting resin. The need of footpath pavement having a strength of 40 kg/cm$^2$ or more is already described in the guidebook to the resinous thin layer pavement, of mortar construction process, by Japan's Resinous Paving Association, and the need for a water-permeability coefficient of $10-2$ cm/sec or more is given there by the standard for water-permeable asphalt pavement. A more preferable quantity of thermosetting resin is 4–10 weight parts in view of commercial profitability and the strength of the end product.

The desirable quantity of cellulose or its derivative to be added to thermosetting resin is 1–20 weight parts per 100 weight parts of the resin. When the prices and binding capability of the additive are considered a most preferable quantity of cellulose to be added is 1–8 weight parts per 100 weight parts of the resin.

The preferable quantity of the inorganic substance for addition to the resinous paving composition is 5–200 weight parts per 100 weight parts of the thermosetting resin. If this additive is in excess of 200 weight parts the viscosity of the adhesive rises, making it very difficult for it to get evenly mixed with the graniform aggregate, and if it is 5 or less weight parts, the above described anti-weathering effects of the resinous paving material are not maximized.

The resinous composition for road paving of the present invention can also comprise 100 weight parts of aggregate, 2–20 weight parts of thermosetting resin as a binder and 1–30 weight parts of lignocellulose or its derivative, as the additive per the 100 weight parts of the resin.

If the quantity of thermosetting resin exceeds 20 weight parts, the resinous paving material gets better in its overall strength but its water-permeability falls and the high prices of resin reduce profitability. When, however, the quantity of thermosetting resin is less than 2 weight parts, the water-permeability of the composition rises but the loss of strength is noticeable. Hence, use of 2–20 weight parts of thermosetting resin is desirable in order to produce a water-permeable paving composition for footpaths of over 40 kg/cm$^2$ strength and $10^{-2}$ cm/sec$^2$ or more water-permeability. That the strength of footpaths should be over 40 kg/cm$^2$ is already described in the guidebook on resinous thin layer pavement, of the Methods for Mortar Construction, by Japanese Resinous Paving Association, and the need for over $10^{-2}$ cm/sec$^2$ water-permeability coefficient is given by the standards for water-permeable asphalt.

As for the quantity of the inorganic substance added to the resinous paving composition about 5–200 weight parts per 100 weight parts of lignocellulose or its derivative is preferable, 20–100 weight parts even more so. If it is added in excess of 200 weight parts the viscosity of the binder gets too high, it is difficult to mix with the granular aggregate, and when it is used in less than 5 weight parts the above-said anti-weathering effects of the resinous paving material is not maximized.

The water-permeable paving material of the present invention as described above shows more than twice as much the anti-compression strength of the conventional paving material using thermosetting resin alone, with the same water-permeation coefficient. Using the same amount of resin as in the conventional water-permeable pavement it is possible to mix with more than twice as much aggregate, and because it can be used so as to make the resinous layer as thin as 20 mm, the composition in accordance with the present invention has an advantage that it can be directly applied on the top of the upper layer made of crushed stone whose particle size is well unified, water-permeable concrete, or water-permeable asphalt. Although unsaturated polyester resin has an advantage of being cheaper priced than epoxy resins, and also hardens faster, it has not been used in production of resinous pavements due to its low binder strength. However, in the present invention, even when unsaturated polyester resin is used, as great anti-compression strength is secured as when epoxy resin is used. It is now possible to use unsaturated polyester resin which is cheaper and faster hardening. Accordingly, for footpaths, which relatively require less anti-compression strength than driveways, it is now possible to form resinous pavement, that costs far less and is much stronger in anti-wear resistance to prepare water-permeable resin compositions for footpaths as illustrated in FIG. 1. Also, in accordance with the present invention it has become possible to use less resin, since the combined use of cellulose and inorganic substances as the additive. Further, the present invention allows the possibility of providing high strength water-permeable resinous pavement for driveways, which require far higher anti-compression strength. Moreover, by raising the anti-compression strength of the high strength water-permeable resinous pavement of the present invention to over 200 kg/cm$^2$ it is now possible to pave parking spaces, driveways, and others with resinous paving material.

Examples of embodiments of the present invention are given below, at times in comparison with prior arts.

EXAMPLES 1-5

Examples 1-5 all use 90 weight parts of crushed stone of 2.3 mm-4.7 mm in the granular diameter in as the aggregate, 10 weight parts of unsaturated polyester as the thermosetting resin in common, and cellulose as shown in Table 1, as additives of the resin. At first the cellulose was completely mixed with the thermosetting resin, the mixture was then mixed completely with the granular aggregate in the concrete mixer for 3-5 minutes and stood to harden in a mold to form the resinous paving composition of the present invention. Then the composition was stood alone at 25 degrees C. for 10 days to harden completely. Thereupon its anti-compression strength and water-permeability coefficients were measured, the results being as given in Table 1. In examples 1 to 5 were used 1.5 weight parts of Co-Naph as hardening accelerator, 1.5 weight parts of MEKPO as hardener for thermosetting resin. The unsaturated polyester used was Aegyong Chemical Ltd.'s PG-284. The anti-compression ("A-C") strength of the resinous paving composition was measured by KS-F2405 and its water-permeability ("W-P") coefficients, by KS-F2322.

TABLE 1

Example 1
Composition of water-permeable resinous paving material: Aggregate . . . crushed stone; 2.3 mm-4.7 mm (90 weight parts) Reinforcing resin . . . unsaturated polyester (10 wps) * Additive . . . alpha cellulose (6 wps) A-c strength (kg/cm$^2$) . . . 222 W-p coefficient (cm/sec)×10 . . . 3.5

Example 2
Composition of water-permeable resinous paving material: Aggregate . . . crushed stone; 2.3 mm-4.7 mm (90 wps) resin . . . unsaturated polyester (10 wps) * Additive . . . methyl cellulose (6 wps) W-p coefficient (cm/sec)×10 . . . 3.2

Example 3
Composition of water-permeable resinous paving materials: Aggregate . . . crushed stone; 2.3 mm-4.7 mm (90 wps) resin . . . unsaturated polyester (10 wps) *Additive . . . ethyl cellulose (6 wps) A-c strength (kg/cm$^2$) . . . 250 W-p coefficient (cm/sec)×10 . . . 3.3

Example 4
Composition of water-permeable resinous paving materials: Aggregate . . . crushed stone; 2.3 mm-4.7 mm ( 90 wps ) resin . . . unsaturated polyester (10 wps) *Additive . . . hydroxypropyl cellulose ( 6 wps) A-c strength (kg/cm$^2$) . . . 224 W-p coefficient (cm/sec)×10 . . . 3.3

Example 5
Composition of water-permeable resinous paving materials: Aggregate . . . crushed stone; 2.3 mm-4.7 mm (90 wps) resin . . . unsaturated polyester (10 wps) *Additive . . . methyl cellulose (3 wps)/ethyl cellulose (3 wps) A-c strength (kg/cm$^2$) . . . 245 W-p coefficient (cm/sec)×10 . . . 3.2 *Quantity of additive by wps value to 100 wps of resin.

EXAMPLES 6-7

In these examples different types of resins and additives were used, as shown in Table 2. The hardener used in Example 6 was the same as in Examples 1-5, but in Example 7 35 weight parts of polyamide was used as hardener. The vinylester used in Example 6 was Aegyong Chemicals Ltd.'s VE-604 while the epoxy used in Example 7 was Kukdo Chemical Ltd.'s YD-115.

TABLE 2

Example 6
Composition of water-permeable resinous paving material: Aggregate . . . crushed stone 2.3 mm-4.7 mm (90 wps) resin . . . vinylester (10 wps) * Additive . . . ethylhydroxethyl cellulose (8 wps) A-c strength (kg/cm$^2$) . . . 286 W-p coefficient (cm/sec)×10 . . . 3.6

Examples 7
Composition of water-permeable resinous paving material: Aggregate . . . crushed stone 2.3 mm-4.7 mm (90 wps) resin . . . epoxy (10 wps) *Additive . . . hydroxypropyl cellulose (8 wps) A-c strength (kg/cm$^2$) . . . 252 W-p coefficient (cm/sec)×10 . . . 3.7 *Quantity of additive by wps value to 100 wps of resin.

EXAMPLES 8-14

These examples 8-14 were performed using the kinds and components of the aggregate, thermosetting resin, and additives as given in Table 3. The hardener used are the same as in Examples 1-5, the unsaturated polyester being Aegyong Chemicals Ltd.'s FG-284, and the vinylester, VE-604 of the same maker.

The color sand for Example 13 was "color celven: green," made by Nihon Ginsha, Japan; while the color ceramic in Example 14 was Daorarec (green), as a product of Japan's CERAUEI Ltd. the experimental method was the same as in Examples 1-5.

Example 8
Composition of water-permeable resinous paving material: Aggregate . . . orbed natural stone; 2.3 mm-4.7 mm (98 wps) resin . . . unsaturated polyester (2 wps) *Additive . . . benzyl cellulose ( 8 wps ) A-c strength (kg/cm$^2$) . . . 42 W-p coefficient (cm/sec)×10 . . . 8.4

Example 9
Composition of water-permeable resinous paving material: Aggregate . . . orbed natural stone; 2.3 mm-4.7 mm (94 wps) resin . . . unsaturated polyester (6 wps) *Additive . . . benzyl cellulose (8 wps) A-c strength (kg/cm$^2$) . . . 186 W-p coefficient (cm/sec)×10 . . . 8.4

Example 10
Composition of water-permeable resinous paving material: Aggregate . . . orbed natural stone; 2.3 mm-4.7 mm (85 wps) resin . . . unsaturated polyester (15 wps) *Additive . . . benzyl cellulose (8 wps) A-c strength (kg/cm$^2$) . . . 390 W-p coefficient (cm/sec)×10 . . . 0.78

Example 11
Composition of water-permeable resinous paving material: Aggregate . . . orbed natural stone; 2.3 mm-4.7 mm (80 wps) resin . . . unsaturated polyester (20 wps) *Additive . . . benzyl cellulose (8 wps) A-c strength (kg/cm$^2$) . . . 500 W-p coefficient (cm/sec)×10 . . . 0.50

Example 12
Composition of water-permeable resinous paving material: Aggregate . . . orbed natural stone; 2.3 mm-4.7 mm (94 wps) resin . . . vinylester (6 wps) *Additive . . . ethylhydroxyethyl cellulose (8 wps) A-c strength (kg/cm$^2$) . . . 210 W-p coefficient (cm/sec)×10 . . . 8.6

Example 13
Composition of water-permeable resinous paving material: Aggregate . . . orbed natural stone; 1.0 mm–2.0 mm (94 wps) resin . . . vinylester (6 wps) *Additive . . . ethylhydroxyethyl cellulose (8 wps) A-c strength (kg/cm$^2$) . . . 243 W-p coefficient (cm/sec)×10 . . . 7.4

Example 14
Composition of water-permeable resinous paving material: Aggregate . . . orbed natural stone; 1.0 mm–2.0 mm (94 wps) resin . . . vinylester (6 wps) *Additive . . . ethylhydroxyethyl cellulose (8 wps) A-c strength (kg/cm$^2$) . . . 317 W-p coefficient (cm/sec)×10 . . . 7.5 *Quantity of additive by wps value to 100 wps of resin.

Examples 15–21

In these examples inorganic substances of fine granular or of fibrous form were also used together with the same types of aggregate, thermosetting resin, and cellulose or its derivative as used in Examples 1–14. And in Examples 15–18, in particular, 1.5 weight parts of Co-Naph as the hardening accelerator and 1.5 weight parts of MEKPO has a hardener were used. Of the inorganic substances used, talc was Ilshin Industry Ltd.'s PA-A400; rock wool, Kumgang Ltd.'s loose wool type; silica, Fine Ceramic Ltd.'s silica S-1600; glass fiber, Nittobo Ltd.'s Cs 6E-277; and asbestos, Calibria Ltd.'s asbestos RG-244. Apart from the process of completely mixing cellulose and the respective inorganic substances with the thermosetting resin, all the same processes as Examples 1–14 were carried out, the resulting data are given in Table 4.

TABLE 4

Example 15
Composition of water-permeable resinous paving material: Aggregate . . . crushed stone; 2.3 mm–4.7 mm (90 wps) resin . . . unsaturated polyester (10 wps) *Additive . . . benzyl cellulose and talc (2 wps/50 wps) A-c strength (kg/cm$^2$) . . . 232 W-p coefficient (cm/sec)×10 . . . 2.9

Example 16
Composition of water-permeable resinous paving material: Aggregate . . . crushed stone; 2.3 mm–4.7 mm (90 wps) resin . . . unsaturated polyester (10 wps) *Additive . . . benzyl cellulose/rock wool (2 wps/10 wps) A-c strength (kg/cm$^2$) . . . 255 W-p coefficient (cm/sec)×10 . . . 3.0

Example 17
Composition of water-permeable resinous paving material: Aggregate . . . crushed stone; 2.3 mm–4.7 mm (90 wps) resin . . . unsaturated polyester (10 wps) *Additive . . . benzyl cellulose/silica (2 wps/100 wps) A-c strength (kg/cm$^2$) . . . 232 W-p coefficient (cm/sec)×10 . . . 3.5

Example 18
Composition of water-permeable resinous paving material: Aggregate . . . orbed natural stone; 2.3 mm–4.7 mm (90 wps) resin . . . unsaturated polyester (10 wps) *Additive . . . benzyl cellulose/silica (2 wps/100 wps) A-c strength (kg/cm$^2$) . . . 224 W-p coefficient (cm/sec)×10 . . . 3.0

Example 19
Composition of water-permeable resinous paving material: Aggregate . . . crushed stone; 2.3 mm–4.7 mm (90 wps) resin . . . epoxy (10 wps) *Additive . . . alpha cel./glass fiber (2 wps/30 wps) A-c strength (kg/cm$^2$) . . . 232 W-p coefficient (cm/sec)×10 . . . 3.5

Example 20
Composition of water-permeable resinous paving material: Aggregate . . . orbed natural stone; 2.3 mm–4.7 mm (90 wps) resin . . . unsaturated polyester (10 wps) *Additive . . . methylhydroxyethyl cel./asbestos (2 wps/60 wps) A-c strength (kg/cm$^2$) . . . 240 W-p coefficient (cm/sec)×10 . . . 3.2

Example 21
Composition of water-permeable resinous paving material: Aggregate . . . orbed natural stone; 2.3 mm–4.7 mm (90 wps) resin . . . epoxy (10 wps) *Additive . . . ethylhydroxyethyl cellulose/talc (2 wps/150 wps) A-c strength (kg/cm$^2$) . . . 245 W-p coefficient (cm/sec)×10 . . . 3.5 *Quantity of additive by wps value to 100 wps of resin.

COMPARATIVE EXAMPLES 1–4

Examples 1–4 of comparative experiment is to obtain resin paving composition by mixing of the aggregate and thermosetting resin alone in the conventional prior art processes, all the other experimental processes and test conditions exactly the same as in the cases of examples given above. The resulting data are shown in Table 5.

TABLE 5

Comparative Example 1
Composition of water-permeable resinous paving material: Aggregate . . . crushed stone; 2.3 mm–4.7 mm (90 wps) resin . . . unsaturated polyester (10 wps) A-c strength (kg/cm$^2$) . . . 80 W-p coefficient (cm/sec)×10 . . . 3.8

Comparative Example 2
Composition of water-permeable resinous paving material: Aggregate . . . crushed stone; 2.3 mm–4.7 mm (90 wps) resin . . . vinylester (10 wps) A-c strength (kg/cm$^2$) . . . 95 W-p coefficient (cm/sec)×10 . . . 3.8

Comparative Example 3
Composition of water-permeable resinous paving material: Aggregate . . . crushed stone; 2.3 mm–4.7 mm (90 wps) resin . . . epoxy (10 wps) A-c strength (kg/cm$^2$) . . . 105 W-p coefficient (cm/sec)×10 . . . 3.8

Comparative Example 4
Composition of water-permeable resinous paving material: Aggregate . . . orbed, natural stone; 2.3 mm–4.7 mm (94 wps) resin . . . vinylester (6 wps) A-c strength (kg/cm$^2$) . . . 55 W-p coefficient (cm/sec)×10 . . . 3.5

EXAMPLES 22–27

(1) Preparation of Methylated Wooden Powder

As a derivative of lignocellulose, methylated wooden powder was prepared. Firstly, 50 g of (from 20 mesh to 60 mesh) pine wooden powder desiccated in a radiator was placed in a 1-liter reaction flask, 500 ml of toluene was added thereto and it was stirred at room temperature for an hour to turn into micelle. Again, 50 ml of iodized methyl was added thereto, the container sealed tight, the temperature being raised to 80 degrees C., it was reacted with stirring for three to six hours. If when the reaction comes to completion the stirring is halted, the reacted solution is divided to two layers, then wherefrom the toluene was removed, a solution of acetic acetone and methanol (in ratio of 3:7 in volume) was poured after stirring, neutralizing and washing and the liquid was removed. Then a plentiful amount of acetone was added thereto in the same progress as stated above, and, after stirring, it was twice washed and filtered, dried in a hot-air dryer at 60 degrees C. for one day, and vacuumdried at 50 degrees C. to give a sample. The obtained sample and methylated wood powder, was solid powder of a yellowish orange tint, and the apparent increase of weight was about eight percent.

(2) Preparation of Permeable Resin Paving Material Using Methylated Wooden Powder According to composition exhibited in Table 1 methylated wooden powder is added to unsaturated polyester resin (Trade name: FG-284 by Aegyong Chemical Co., Ltd.) or epoxy resin (Trade name: YD-115 by Kukdo Chemical Co., Ltd.) and it is mixed sufficiently stirring. In examples using unsaturated polyester resin, MEXPO as a hardener and Co-Naph as a hardening accelerator are added thereto 2 weight parts per 100 weight parts of resin, respectively. In examples using epoxy resin polyamide is added thereto 30 weight parts per 100 weight parts of resin.

The resulting mixture is mixed sufficiently with 2-5 mm diameter of crushed stone in a concrete mixer for 5 minutes and is hardened to give permeable resin paving material. Anti-compression strength and permeability coefficient of the resulting paving material is exhibited in Table 6. Anti-compression strength of the paving material is value measured, after hardening it completely, by KS-F2405 and permeability is measured by KS-F2322.

TABLE 6

Example 22
Composition (in weight parts): Aggregate ... crushed stone 100 resin ... unsaturated polyester 10 Additive ... methylated wood powder 0.5 A-c strength $(kg/cm^2)$ ... 221 W-p coefficient $(cm/sec) \times 10$ ... 5.7

Example 23
Composition (in weight parts): Aggregate ... crushed stone 100 resin ... unsaturated polyester 10 Additive ... methylated wood powder 1.0 A-c strength $(kg/cm^2)$ ... 245 W-p coefficient $(cm/sec) \times 10$ ... 5.3

Example 24
Composition (in weight parts): Aggregate ... crushed stone 100 resin ... unsaturated polyester 10 Additive ... methylated wood powder 2.0 A-c strength $(kg/cm^2)$ ... 260 W-p coefficient $(cm/sec) \times 10$ ... 3.6

Example 25
Composition (in weight parts): Aggregate ... crushed stone 100 resin ... unsaturated polyester 10 Additive ... methylated wood powder 3.0 A-c strength $(kg/cm^2)$ ... 287 W-p coefficient $(cm/sec) \times 10$ ... 2.1

Example 26
Composition (in weight parts): Aggregate ... crushed stone 100 resin ... epoxy 10 Additive ... methylated wood powder 2.0 A-c strength $(kg/cm^2)$ ... 267 W-p coefficient $(cm/sec) \times 10$ ... 2.5

Example 27
Composition (in weight parts): Aggregate ... crushed stone 100 resin ... epoxy 10 Additive ... methylated wood powder 3.0 A-c strength $(kg/cm^2)$ ... 260 W-p coefficient $(cm/sec) \times 10$ ... 1.9

COMPARATIVE EXAMPLES 5-7

In comparative Example 5 resinous paving material was prepared by mixing only thermosetting resin and the aggregate, and in Comparative Examples 6 and 7 the paving material was prepared by mixing the resin and inorganic substances, the resulting data are given in Table 7. All the other processes of this experiments were the same as in experiments listed above.

TABLE 7

Comparative Example 5
Composition (in weight parts): Aggregate ... crushed stone 100 resin ... unsaturated polyester 10 Additive ... None A-c strength $(kg/cm^2)$ ... 70 W-p coefficient $(cm/sec) \times 10$ ... 6.7

Comparative Example 6
Composition (in weight parts): Aggregate ... crushed stone 100 resin ... unsaturated polyester 10 Additive ... talc 5.0 A-c strength $(kg/cm^2)$ ... 110 W-p coefficient $(cm/sec) \times 10$ ... 0.4

Comparative Example 7
Composition (in weight parts): Aggregate ... crushed stone 100 resin ... epoxy 10 Additive ... talc 5.0 A-c strength $(kg/cm^2)$ ... 121 W-p coefficient $(cm/sec) \times 10$ ... 0.5

What is claimed is:

1. A road paving composition, comprising:
   about 100 weight parts of granular aggregate:
   about 2-20 weight parts of thermosetting resin as a binder;
   about 1-20 weight parts of a compound selected from the group consisting of ethyl cellulose, ethylhydroxyethyl cellulose, hydroxypropyl cellulose, benzyl cellulose, and cellulose acetate and chemically modified lignocellulose as an additive to be mixed with thermosetting resin per 100 weight parts of thermosetting resin.

2. The road paving composition of claim 1, in which the diameter of the granular aggregate is 0.5 mm-15 mm.

3. The road paving composition of accordance with claim 1, comprising 4-10 weight parts thermosetting resin.

4. The road paving composition of claim 3, wherein the thermosetting resin is any one of resins selected from the group consisting of epoxy resins, unsaturated polyester resins, urethane resins, phenol resins, melamine resins, and urea resins.

5. The road paving composition of claim 4, comprising a hardener of polyamide resin or tetraethytriamine when the thermosetting resin is an epoxy resin.

6. The road paving composition of claim 4, comprising a hardener of methylethyl ketone peroxide or benzoyl peroxide when the thermosetting resin is an unsaturated polyester.

7. The road paving composition of claim 1, in which the viscosity of the thermosetting resin is 500-5,000 cps.

8. The road paving composition of claim 1, in which the compound is selected from the group consisting of ethyl cellulose, ethylhydroxyethyl cellulose, hydroxypropyl cellulose, benzyl cellulose, and cellulose acetate and chemically modified lignocellulose as an additive to be mixed with thermosetting resin comprises 1-8 weight parts per 100 weight parts of the thermosetting resin.

9. The road paving composition of claim 1, in which the chemically modified lignocellulose is a substance chemically modified by an etherizing reaction of lignocellulose.

10. A road paving composition, comprising:
   about 100 weight parts of granular aggregate;
   about 2-20 weight parts of thermosetting resin as a binder;
   about 1-20 weight parts of a compound selected from the group consisting of ethyl cellulose, ethylhydroxyethyl cellulose, hydroxypropyl cellulose, benzyl cellulose, and cellulose acetate and chemically modified lignocellulose as an additive to be mixed with thermosetting resin per 100 weight parts of thermosetting resin; and
   about 5-200 weight parts of an inorganic substance of fine granular or fibrous form per 100 weight parts of thermosetting resin.

11. The road paving composition of claim 10, further comprising 20-100 weight parts of said inorganic substance.

12. The road paving composition of claim 11, in which the said inorganic substance is selected from the group consisting of talc, calcium carbonate, silica, titanium dioxide, glass fiber, rock wool, and asbestos.

13. A water-permeable resinous paving layer, comprising:
   100 weight parts of granular aggregate;
   2-20 weight parts of thermosetting resin as a binder;
   1-30 weight parts of a compound selected from the group consisting of ethyl celluloses, ethylhydroxyethyl cellulose, hydroxypropyl cellulose, benzyl cellulose, and cellulose acetate and chemically modified lignocellulose as an additive to be mixed with thermosetting resin per 100 weight parts of thermosetting resin; and
   5-100 weight parts of an inorganic substance of fine granular or fibrous form per 100 weight parts of thermosetting resin, 14. The road paving composition of claim 13, further comprising 20-100 weight parts of said inorganic substance.

15. The road paving composition of claim 14, in which the said inorganic substance is selected from the group consisting of talc, calcium carbonate, silica, titanium dioxide, glass fiber, rock wool, and asbestos.

* * * * *